United States Patent [19]

Rejsa et al.

[11] 3,915,082

[45] Oct. 28, 1975

[54] FRUIT PITTING APPARATUS

[75] Inventors: Jack J. Rejsa; Dominic J. Maniak, both of Minneapolis, Minn.

[73] Assignee: The Pillsbury Company, Minneapolis, Minn.

[22] Filed: Mar. 7, 1974

[21] Appl. No.: 449,163

[52] U.S. Cl. .................. 99/552; 99/548; 99/554; 99/555; 99/563
[51] Int. Cl.² .................. A23N 4/06; A23N 4/04
[58] Field of Search ............... 99/547, 548, 552–556, 99/559, 560, 563, 565, 585, 640; 222/415; 17/73, 84, 48; 221/251, 253

[56] References Cited
UNITED STATES PATENTS

| | | |
|---|---|---|
| 2,913,028 | 11/1959 | Hait .................................. 99/563 |
| 3,407,435 | 10/1968 | Welcker ............................ 17/48 |
| 3,526,344 | 9/1970 | Koning ............................. 222/415 |
| 3,688,826 | 9/1972 | Amori ............................... 99/563 |

*Primary Examiner*—Harvey C. Hornsby
*Assistant Examiner*—James A. Niegowski
*Attorney, Agent, or Firm*—James V. Harmon; Michael D. Ellwein

[57] ABSTRACT

Fruit such as cherries are pitted by passing them between a pair of parallel rolls rotating in opposite directions to force them into contact with the edge of a moving cutting blade such as a band saw blade running between the rolls along an axis parallel with the adjacent roll surfaces. The rolls drive the pulp of the fruit downwardly past the blade. The pits are carried along with the blade toward the end of the rolls.

9 Claims, 5 Drawing Figures

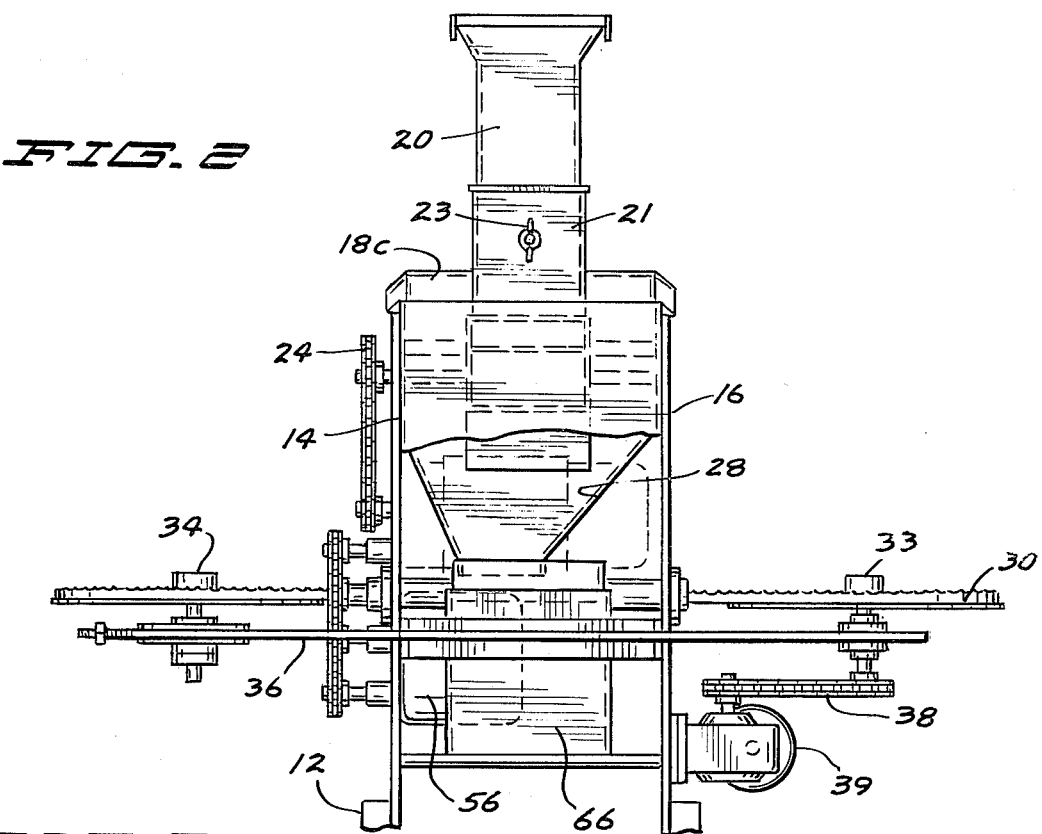
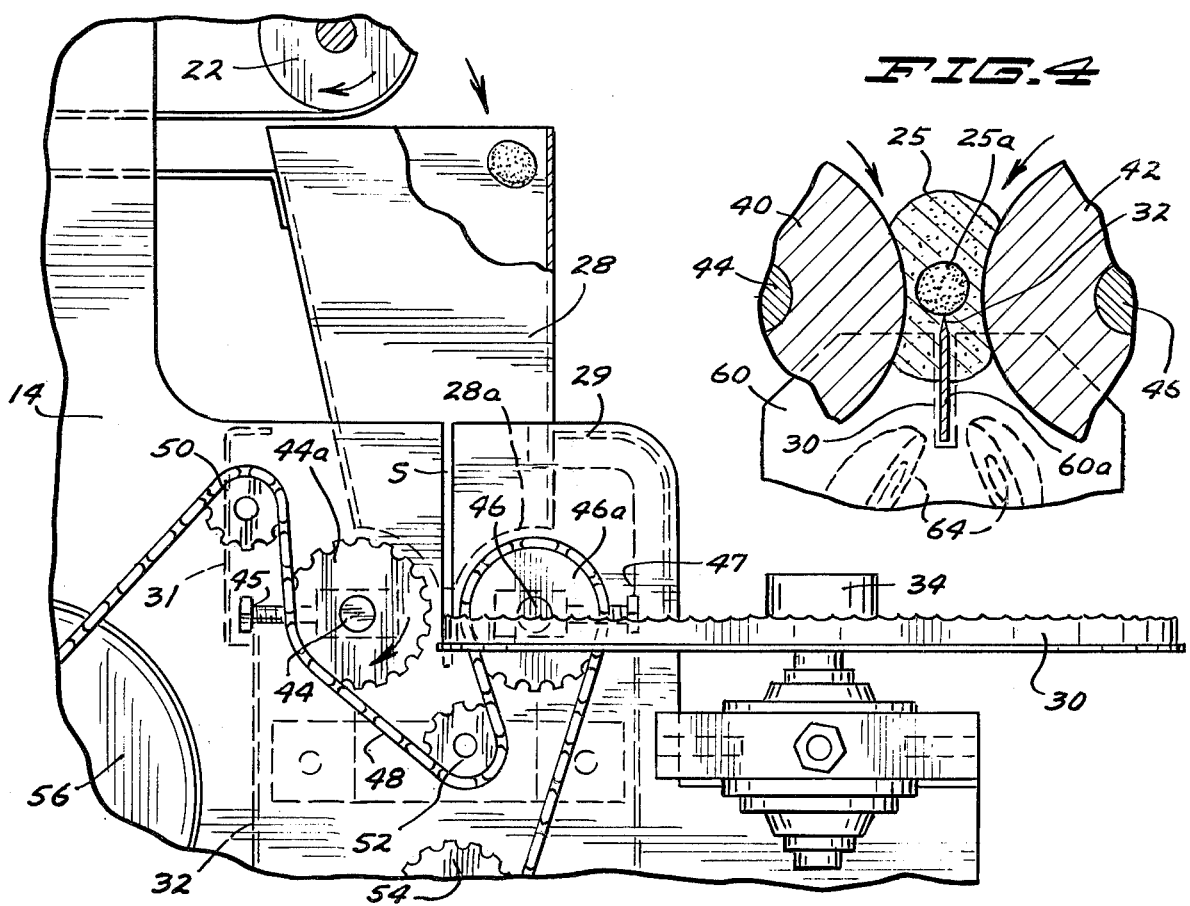

3,915,082

FRUIT PITTING APPARATUS

FIELD OF THE INVENTION

The invention relates to the processing of foods and more particularly to an apparatus for removing fruit pits.

THE PRIOR ART

Pits are commonly removed from fruit by allowing them to fall into pockets within a rotating drum. At the proper time a punch of approximately the same size of the pit is driven through the center of each pocket thereby forcing the pit through a hole at the bottom of the pocket. This equipment has not been entirely satisfactory primarily because the punch occasionally misses the pit completely or catches the pit and splits it into pieces which contaminate the finished product. Accordingly, many suppliers of pitted fruit such as cherries currently guarantee no less than one pit per 100 cherries. If the cherries are used in pies, this can mean one cherry pit per pie which is highly objectionable to the consumer and pie manufacturer.

OBJECTS

The primary objects are to (*a*) reliably remove all of the pits from fruit such as peaches, apricots, cherries, plums, etc. (*b*) feed the fruit to the pit removing elements at a uniform and controlled rate, (*c*) provide a relatively large capacity such as 7,000 pounds or more per hour with a smaller, more economical piece of equipment than has heretofore been available, (*d*) provide means for handling pits of different sizes and (*e*) reliably preventing the pits once they are removed from being mixed with the pulp.

SUMMARY OF THE INVENTION

Fruits are pitted by passing them through a gap or nip between a pair of parallel rolls rotating in opposite directions to force the fruit into contact with the edge of a blade located between the rolls with its cutting edge positioned substantially on an axis parallel with the adjacent roll surfaces. The rolls drive the soft portions of the fruit, i.e., the pulp downwardly past the blade. The size of the gap prevents the pits from being transferred past the blade by the rolls.

THE FIGURES

FIG. 2 is a end elevational view on line 2—2 of FIG. 1.

FIG. 4 is a enlarged cross-sectional view taken on line 4—4 of FIG. 5, and

FIG. 5 is a semi-diagramatic cross-sectional view of the apparatus taken in a vertical plane passing through the nip between the rolls 40 and 42.

DESCRIPTION OF THE PREFERRED EMBODIMENT

Figure 1:
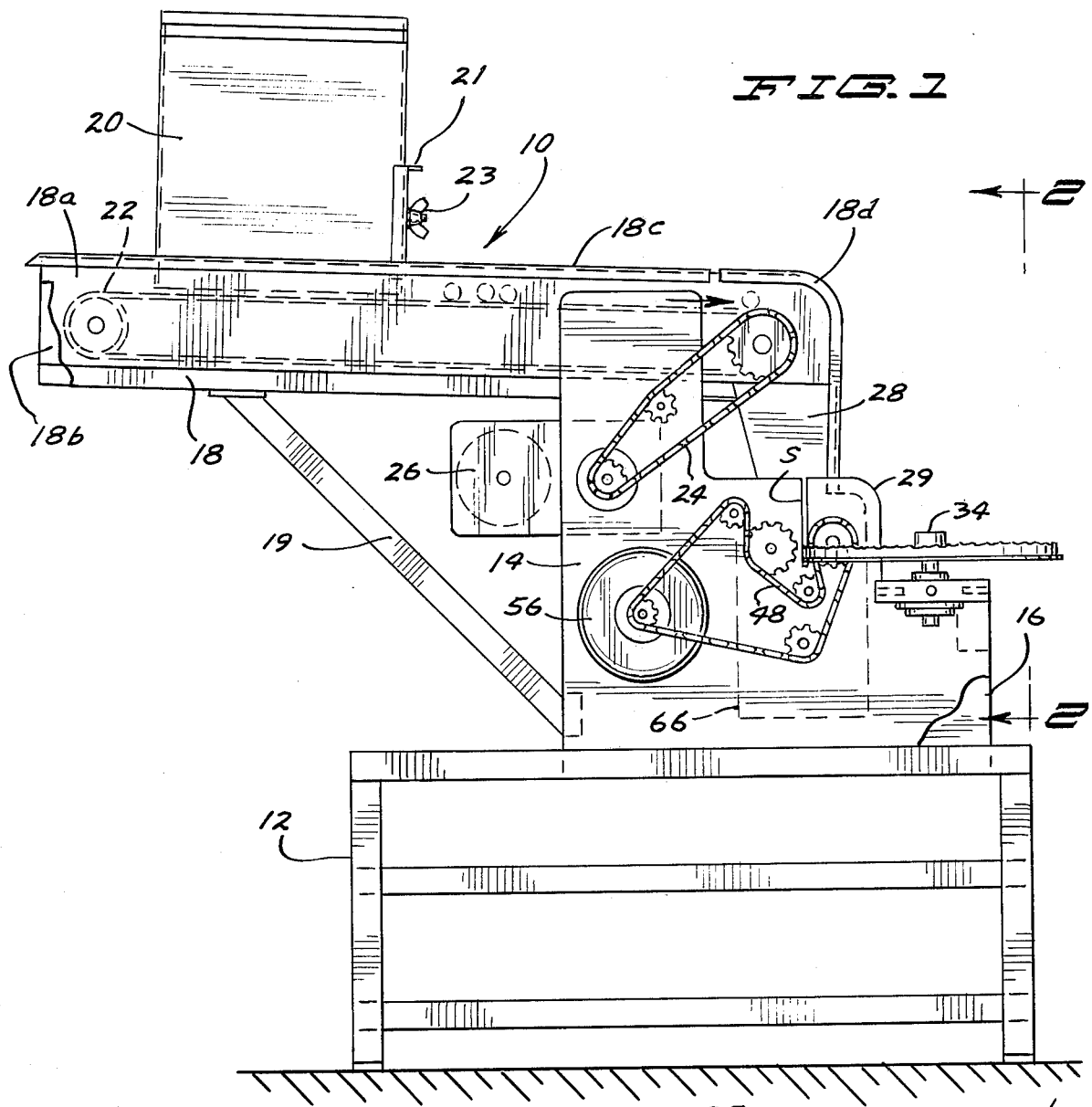
FIG. 1 is a side elevational view of an apparatus embodying the invention.

As seen in the figures, the pit removing apparatus 10 includes a supporting framework indicated generally by numeral 12. On framework 12 are mounted two vertically extending side plates 14 and 16 each suitably affixed as by welding to the framework 12. Secured to the upper end of each plate is a rearwardly extending framework 18 having sidewalls 18a and 18b (FIG. 1) and removable covers 18c and 18d supported in part by brace arm 19. On the framework 18 is a belt conveyor 22 including a flexible belt entrained over spaced rolls at their ends for conveying the fruit such as cherries 25 from a supply hopper 20 to a feed guide 28 below the right end thereof as seen in FIG. 1. The feed hopper 20 is provided with a control gate 21 the vertical height of which can be adjusted by a thumbscrew 23 for regulating the depth of the fruit on the conveyor 22. The apparatus is usually run so that one layer of fruit is provided on the conveyor 22. The conveyor 22 is operated by a sprocket and chain assembly 24 connected to suitable drive motor 26.

The hopper 20 conveyor 22 and gate 21 serves as a fruit inlet and supplies the fruit at a continuous and controlled rate to the pit removing assembly.

Figure 3:
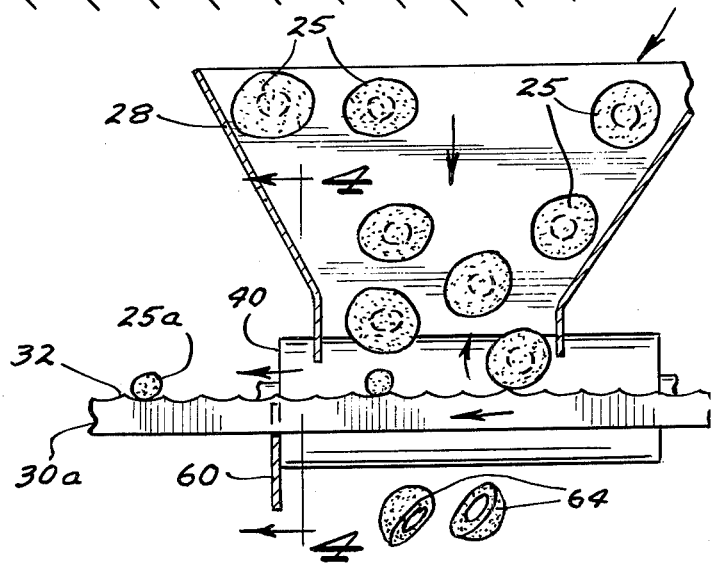
FIG. 3 is a partial enlarged view of the upper right hand side of the apparatus of FIG. 1.

Positioned immediately below the conveyor 22 is a fruit feeding hopper 28 composed of four sidewalls connected together at their edges. Two of the walls are provided as seen in FIG. 3 with contoured lower edges 28a adapted to match the surface of the feed rolls described below. The forward portion of the apparatus between plates 14 and 16 is enclosed with a removable cover 29. As best seen in FIGS. 2 and 3, an endless cutting blade or saw blade 30 is entrained over a pair of support wheels 33 and 34 in a vertical position with a portion thereof designated 30a (FIG. 5) extending laterally through the apparatus within slots S only one of which is shown the respective plates 14 and 16. The blade 30 is provided with a scalloped upper edge 32 and can consist of a standard scalloped edged meat cutting blade which in one model of the invention measured ⅝ inches x 0.025 inches. The wheels 33 and 34 are suitably journalled for rotation on a support plate 36 and rotation is imparted thereto through a chain and sprocket assembly 38 by a drive motor 39. As is best seen in FIGS. 4 and 5, a pair of parallel transversely extending horizontally disposed fruit engaging rolls 40 and 42 are journalled for rotation between plates 14 and 16 upons shafts 44 and 46. The spacing between the rolls 40 and 42 is less than the diameter of the whole fruit piece 25 and greater than the diameter of the pit 25a. The spacing between the cutting edge and the adjacent portion of each roll should be no greater than the diameter of the pit to prevent the pit from being carried by the rolls along with the cut fruit pieces. The rolls preferably have a high friction surface. A medium diamond knurl was found satisfactory. The rolls are driven in opposite directions with their surfaces moving downwardly at the nip, i.e., away from the fruit supply by a drive chain and sprocket assembly 48 which is engaged with sprockets 44a and 46a on the corresponding roll shafts. The spacing between the rolls can be selectively changed as desired by means of moveable journal mounting blocks which are moved either toward or away from one another by a suitable adjusting bolts 45 and 47, only those on side toward the observer being shown in FIG. 3. The drive chain 48 is entrained over idlers 50, 52 and 54 and is coupled to a drive motor 56 which runs at the proper speed to turn the rolls at about 750 RPM in a typical application utilizing 4 inch diameter rolls. The blade 30 is typically run at 650 FPM. As shown in FIGS. 4 and 5, a vertically disposed shield 60 is provided at the downstream end of the rolls 40 and 42. The shield has a central vertical slot 60a to accomodate the blade 30 and is held in place by being suitably attached to the framework 12 of the apparatus.

The spacing between rolls 40 and 42 must be greater than the diameter of the fruit pit 25a but not more than approximately twice the thickness of the pit to prevent the pit from being carried by the rolls 40 and 42 past the blade along with the fruit. Stated another way the clearance between the tip of the cutting blade 32 and the adjacent roll surfaces should be less than the diameter of the fruit pit 25a to prevent the pits from passing between the blade and the rolls. The apparatus can be used with either raw or cooked fruit or can be used for removing the relatively few pits left after a conventional fruit pitting operation has already been performed. The invention is reliable in operation, can be manufactured economically and cuts the fruit into halves as the pit is being removed.

As seen in FIGS. 4 and 5 the cherries 25 fall from conveyor 22 through hopper 28 and are engaged on either side by the rolls 40–42 which are not close enough together to touch the seed or pit 25a. The downward pressure of the rotating rolls maintains the fruit in contact with blade 30 which because of its own frictional engagement with the fruit causes the fruit to rotate in a clockwise direction as seen in FIG. 5. This produces a circular central cut around the entire circumference of the fruit. The downward pressure of rolls 40 and 42 then forces the now separate halves of the fruit piece 64 downwardly into a collection bin 66 (FIG. 1). The shield prevents the cut pieces 64 from traveling with the seed 25a out through the end of the apparatus. The seeds fly at rather high speed horizontally in the direction of the motion of the blade 30. They are collected and disposed of in a suitable manner.

While certain forms of the invention have been shown and described herein, it will be obvious that other modifications and/or equivalents may be employed without departing from the scope of the invention as defined in the appended claims.

What is claimed is:

1. An apparatus for removing the pits from fruit comprising: a fruit inlet means, an elongated blade element having a cutting edge, drive means connected to the blade element for moving the blade along a path parallel to its cutting edge, a pair of rolls mounted for rotation on opposite sides of the cutting edge of the blade and being spaced therefrom with the nip of the rolls being located substantially adjacent and parallel to the cutting edge of the blade, the cutting edge remaining at all times in a fixed plane, said plane being located substantially at the nip of the rolls and containing the axis of each roll, the spacing between the rolls being less than the diameter of the whole fruit piece and greater than the diameter of the pit and the spacing between said cutting edge and the adjacent portion of each roll being no greater than the diameter of the pit to prevent the pit from being carried by the rolls along with the cut fruit pieces, drive means associated with the rolls for rotating the rolls so that said nip portion travels in the direction from the fruit inlet means toward the blade whereby the surfaces of the rolls engage the fruit and force the same into engagement with the blade and the movement of the blade causes the fruit to rotate thereby separating the fruit pulp in two halves which are carried downwardly past the blade from the inlet means by the rolls and the pits are carried by the blade along said path parallel with the cutting edge thereof and are thereby separated from the cut halves of the fruit.

2. The apparatus of claim 1 wherein the rolls and the blade are disposed horizontally and are driven with the adjacent edges traveling downwardly past the edge of the blade and the fruit is transferred into the nip in between the rolls in part by gravity.

3. The apparatus of claim 1 wherein means is provided for feeding the fruit continuously to the rolls and blade at a controlled rate.

4. The apparatus of claim 3 wherein the feeding means comprises a hopper, an endless belt conveyor below the hopper and a gate for controlling the flow of fruit from the hopper onto the conveyor belt.

5. The apparatus of claim 1 wherein the blade is an endless flexible blade entrained over a pair of rotating wheels and a shield is provided at one end thereof in a fixed position to deflect cut fruit traveling in the direction of the blade downwardly to prevent mixing thereof with the separated pits.

6. The apparatus of claim 1 wherein spacing between the rolls is selectively adjustable.

7. The apparatus of claim 1 wherein the blade is an endless flexible blade entrained over a pair of rotating wheels and a shield is provided at one end thereof in a fixed position to deflect cut fruit traveling in the direction of the blade downwardly to prevent mixing thereof with the separated pits and spacing between the rolls is selectively adjustable.

8. The apparatus of claim 1 wherein means is provided for feeding the fruit continuously to the rolls and blade at a controlled rate, the feeding means comprises a hopper, an endless belt conveyor below the hopper, a gate for controlling the flow of fruit from the hopper onto the conveyor belt and the fruit fall by gravity from the belt to the nip between the rolls.

9. The apparatus of claim 1 wherein means is provided for feeding the fruit continuously to the rolls and blade at a controlled rate, the feeding means comprises a hopper, an endless belt conveyor below the hopper and a gate for controlling the flow of fruit from the hopper onto the conveyor belt, the blade is an endless flexible blade entrained over a pair of rotating wheels and a shield is provided at one end of the rolls in a fixed position to deflect cut fruit traveling in the direction of the blade downwardly to prevent mixing thereof with the separated pits and spacing between the rolls is selectively adjustable.

* * * * *